United States Patent
Jo et al.

(10) Patent No.: US 11,476,456 B2
(45) Date of Patent: Oct. 18, 2022

(54) LITHIUM COBALT-BASED POSITIVE ELECTRODE ACTIVE MATERIAL, PREPARATION METHOD THEREOF, POSITIVE ELECTRODE AND SECONDARY BATTERY INCLUDING THE SAME

(71) Applicant: LG Chem, Ltd., Seoul (KR)

(72) Inventors: Chi Ho Jo, Daejeon (KR); Min Kyu You, Daejeon (KR); Sung Bin Park, Daejeon (KR); Hyuck Hur, Daejeon (KR); Jin Tae Hwang, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 294 days.

(21) Appl. No.: 16/756,073

(22) PCT Filed: Nov. 13, 2018

(86) PCT No.: PCT/KR2018/013822
§ 371 (c)(1),
(2) Date: Apr. 14, 2020

(87) PCT Pub. No.: WO2019/093864
PCT Pub. Date: May 16, 2019

(65) Prior Publication Data
US 2020/0259172 A1    Aug. 13, 2020

(30) Foreign Application Priority Data

Nov. 13, 2017 (KR) .................. 10-2017-0150921
Nov. 13, 2018 (KR) .................. 10-2018-0138703

(51) Int. Cl.
*H01M 4/36*    (2006.01)
*C01G 51/00*   (2006.01)
(Continued)

(52) U.S. Cl.
CPC ............ *H01M 4/366* (2013.01); *C01G 51/42* (2013.01); *C01G 51/66* (2013.01); *H01M 4/525* (2013.01);
(Continued)

(58) Field of Classification Search
None
See application file for complete search history.

(56) References Cited

U.S. PATENT DOCUMENTS 8,337,727 B2    12/2012 Chen et al.
2014/0212759 A1  7/2014 Blangero et al.
(Continued)

FOREIGN PATENT DOCUMENTS

CN    105047906 A    11/2015
CN    103500827 B    5/2017
(Continued)

OTHER PUBLICATIONS

European Search Report for Application No. EP18875428.7, dated Nov. 10, 2020, 7 pages.
(Continued)

*Primary Examiner* — Daniel S Gatewood
(74) *Attorney, Agent, or Firm* — Lerner, David, Littenberg, Krumholz & Mentlik, LLP (57) ABSTRACT

A lithium cobalt-based positive electrode active material is provided. The lithium cobalt-based positive electrode active material includes a core portion including a lithium cobalt-based oxide represented by Formula 1 and a shell portion including a lithium cobalt-based oxide represented by Formula 2, wherein the lithium cobalt-based positive electrode active material includes 2500 ppm or more, preferably 3000 ppm or more of a doping element M based on the total weight of the positive electrode active material. An inflection point does not appear in a voltage profile measured
(Continued)

during charging/discharging a secondary battery including the lithium cobalt-based positive electrode active material.

17 Claims, 2 Drawing Sheets

(51) Int. Cl.
    *H01M 4/525* (2010.01)
    *H01M 10/0525* (2010.01)
    *H01M 4/02* (2006.01)

(52) U.S. Cl.
    CPC ..... *H01M 10/0525* (2013.01); *C01P 2002/20* (2013.01); *C01P 2002/32* (2013.01); *C01P 2002/52* (2013.01); *C01P 2004/84* (2013.01); *C01P 2006/40* (2013.01); *H01M 2004/028* (2013.01)

(56) References Cited

U.S. PATENT DOCUMENTS

| | | | |
|---|---|---|---|
| 2015/0380722 A1* | 12/2015 | Blangero | C01G 51/42 252/182.1 |
| 2016/0178130 A1 | 6/2016 | Pemberton | |
| 2017/0222225 A1 | 8/2017 | Kang et al. | |
| 2017/0263925 A1 | 9/2017 | Shim et al. | |
| 2017/0309910 A1 | 10/2017 | Jo et al. | |
| 2017/0317342 A1 | 11/2017 | Kang et al. | |
| 2018/0013129 A1 | 1/2018 | Lee et al. | |
| 2018/0212237 A1 | 7/2018 | Lee et al. | |

FOREIGN PATENT DOCUMENTS

| | | |
|---|---|---|
| EP | 3203554 A1 | 8/2017 |
| JP | 2006164758 A | 6/2006 |
| JP | 2014523840 A | 9/2014 |
| KR | 20140142613 A | 12/2014 |
| KR | 20160038893 A | 4/2016 |
| KR | 20160039983 A | 4/2016 |
| KR | 20160040117 A | 4/2016 |
| KR | 20160040118 A | 4/2016 |
| KR | 20160149162 A | 12/2016 |
| KR | 101762508 B1 | 7/2017 |
| KR | 20170103699 A | 9/2017 |
| WO | 2017002057 A1 | 1/2017 |

OTHER PUBLICATIONS

Wanmin Liu et al., "Surface coating of LiNi0.8Co0.15Al0.05O2 with LiCoO2 by a molten salt method", Surface and Coatings Technology, vol. 216, Feb. 1, 2013, pp. 267-272, XP055745189M.

Yu Jinpeng et al., "The investigation of Ti-modified LiCoO2 materials for lithium ion battery", Journal of Power Sources, Elsevier SA, CH, vol. 262, Mar. 26, 2014, pp. 136-139, XP029025948.

International Search Report from Application No. PCT/KR2018/013822 dated Apr. 15, 2019, 2 pages.

Indian Examination Report for corresponding Indian Application No. 202017018650 dated Feb. 22, 2022, 2 pgs.

\* cited by examiner

LITHIUM COBALT-BASED POSITIVE ELECTRODE ACTIVE MATERIAL, PREPARATION METHOD THEREOF, POSITIVE ELECTRODE AND SECONDARY BATTERY INCLUDING THE SAME

CROSS-REFERENCE TO RELATED APPLICATIONS

The present application is a national stage entry under 35 U.S.C. § 317 of PCT/KR2018/013822 filed on Nov. 13, 2018, which claims priority to Korean Patent Application Nos. 10-2017-0150921, filed on Nov. 13, 2017, and 10-2018-0138703, filed on Nov. 13, 2018, in the Korean Intellectual Property Office, the disclosures of which are incorporated herein in their entirety by reference.

Technical Field

The present invention relates to a lithium cobalt-based positive electrode active material, a preparation method thereof, a positive electrode including the same, and a lithium secondary battery including the positive electrode, and more specifically, to a lithium cobalt-based positive electrode active material having excellent output properties and lifespan properties and capable of implementing excellent high-temperature storage properties by suppressing the generation of gas and cobalt elution even during a high-voltage driving of 4.45 V or greater, a preparation method thereof, a positive electrode including the same, and a lithium secondary battery including the positive electrode.

Background Art

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

One example of positive electrode active materials for a lithium secondary battery which has been actively developed and used is $LiCoO_2$ of a layered structure. $LiCoO_2$ is most widely used since the synthesis thereof is easily achieved and the electrochemical performance thereof, including lifespan properties, is excellent. However, due to the poor structural stability thereof, there is a limitation in applying $LiCoO_2$ to a high capacity battery technology.

In addition, in recent years, as electronic devices become smaller, miniaturization and high capacity are required for a battery applied to an electronic device. In order to implement a high-capacity battery, energy per cell unit volume must be high, which requires high packing density of an active material. In order to increase packing density, an active material having a large particle diameter is advantageous. However, a lithium cobalt-based oxide particle of a large particle diameter has a relatively small specific surface area, so that an active area in contact with an electrolyte is narrow. Furthermore, since the lithium cobalt-based oxide particle of a large particle diameter has a two-dimensional layered structure, the lithium movement rate is slow, so that the rate properties and initial capacity are low.

In Korean Patent Laid-open No. 2016-0038893, disclosed is a technology for forming a lithium defect portion on the surface of a lithium cobalt-based oxide by adding a dopant having high reactivity with lithium when preparing the lithium cobalt-based oxide such that the dopant reacts with lithium.

In the positive electrode active material having a lithium defect portion formed on the surface thereof as described above, the crystal structure of the lithium defect portion is converted into a three-dimensional spinel-like structure to increase the moving speed of the lithium ions, thereby improving output properties and rate properties.

However, according to the studies of the present inventors, the lithium cobalt-based positive electrode active material having a lithium defect portion has no problem when applied to a battery driven at a voltage of less than 4.45 V. However, when applied to a battery driven at a voltage of 4.45 V or greater, the generation of gas and cobalt elution rapidly occur, so that lifespan properties and high-temperature storage properties are significantly deteriorated. Accordingly, it has been confirmed that it is impossible to apply the lithium cobalt-based positive electrode active material having a lithium defect portion to a battery driven at a voltage of 4.45 V or greater.

DISCLOSURE OF THE INVENTION

Technical Problem

An aspect of the present invention provides a lithium cobalt-based positive electrode active material capable of effectively suppressing the generation of gas and cobalt elution even during a high-voltage driving of 4.45 V or greater while having a lithium defect portion on the surface thereof.

Technical Solution

According to an aspect of the present invention, there is provided a lithium cobalt-based positive electrode active material including a core portion including a lithium cobalt-based oxide represented by Formula 1 below and a shell portion including a lithium cobalt-based oxide represented by Formula 2 below, wherein the lithium cobalt-based positive electrode active material includes 2500 ppm or more, preferably 3000 ppm or more of a doping element M based on the total weight of the positive electrode active material, and an inflection point does not appear in a voltage profile measured during charging/discharging a secondary battery including the lithium cobalt-based positive electrode active material.

$$Li_aCo_{1-b}M_bO_2 \qquad \text{[Formula 1]}$$

In Formula 1, M is one or more selected from the group consisting of Al, Mg, W, Mo, Zr, Ti, Fe, V, Cr, Ba, Ca, Sr and Nb, and $1 \le a \le 1.2$ and $0.005 \le b \ge 0.05$.

$$Li_xCo_{1-y}M_yO_2 \qquad \text{[Formula 2]}$$

In Formula 2, M is one or more selected from the group consisting of Al, Mg, W, Mo, Zr, Ti, Fe, V, Cr, Ba, Ca, Sr and Nb, and $0.5 \le x \le 1$ and $0 \le y \le 0.01$.

According to one embodiment, the doping element M may be one or more selected from the group consisting of Al, Mg, Ca, Sr, Ba, Ti, and Zr.

According to another embodiment, the doping element M may be one or more selected from Al and Mg.

According to yet another embodiment, the doping element M may include a first doping element selected from the group consisting of Al, Mg, Ca, Sr, and Ba, and a combination thereof and a second doping element selected from the group consisting of Ti, and Zr, and a combination thereof.

Also, the lithium cobalt-based oxide represented by Formula 1 has a layered crystal structure, and the lithium cobalt-based oxide represented by Formula 2 below has a spinel-like crystal structure.

According to another aspect of the present invention, there is provided a method for preparing a lithium cobalt-based positive electrode active material, the method including a first step in which a core portion including a lithium cobalt-based oxide represented by Formula 1 above is formed by mixing a first cobalt raw material, a first lithium raw material, and a doping element M raw material, and then subjecting the mixture to a first heat treatment, and a second step in which a shell portion including a lithium cobalt-based oxide represented by Formula 2 above is formed by mixing the lithium cobalt-based oxide represented by Formula 1 and a second cobalt raw material, and then subjecting the mixture to a second heat treatment, wherein the doping element M raw material includes one or more selected from the group consisting of Al, Mg, W, Mo, Zr, Ti, Fe, V, Cr, Ba, Ca, Sr, and Nb, and is mixed in an amount of 2500 ppm or more based on the total weight of the lithium cobalt-based positive electrode active material.

At this time, in the first step, it is preferable that the first cobalt raw material, the first lithium raw material, and the doping element M raw material are mixed in an amount such that the atomic ratio of Li/(Co+M) of the core portion is 1 to 1.2.

Also, a second lithium raw material may be further mixed in the second step, and at this time, it is preferable that the second cobalt raw material and the second lithium raw material are mixed in an amount such that the atomic ratio of Li/(Co+M) of the shell portion is 0.05 to less than 1.

According to yet an aspect of the present invention, there is provided a positive electrode including the positive electrode active material according to the present invention and a lithium secondary battery including the positive electrode.

Advantageous Effects

A lithium cobalt-based positive electrode active material according to the present invention has a core portion including a doping element in a high concentration, thereby having excellent structural stability. Accordingly, even though a shell portion with a lithium defect is present, a phase transition to a monoclinic system does not appear during charging/discharging, and even during a high-voltage driving of 4.45 V or greater, the generation of gas and cobalt elution are suppressed, so that excellent lifespan properties and high-temperature storage properties are exhibited.

Also, the lithium cobalt-based positive electrode active material according to the present invention has a shell portion with a lithium defect having an atomic ratio of less than 1 on the surface thereof, thereby having excellent intercalation and de-intercalation of lithium on a particle surface, and thus, capacity properties, rate properties, and lifespan properties are excellent.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

A positive electrode active material according to the present invention is a lithium cobalt-based positive electrode active material including a core portion including a lithium cobalt-based oxide represented by Formula 1 below and a shell portion including a lithium cobalt-based oxide represented by Formula 2 below, wherein the lithium cobalt-based positive electrode active material includes 2500 ppm or more, preferably 3000 ppm or more of a doping element M based on the total weight of the positive electrode active material.

$$Li_aCo_{1-b}M_bO_2 \quad \text{[Formula 1]}$$

In Formula 1, M is one or more selected from the group consisting of Al, Mg, W, Mo, Zr, Ti, Fe, V, Cr, Ba, Ca, Sr and Nb, and $1 \leq a \leq 1.2$ and $0.005 \leq b \leq 0.05$.

$$Li_xCo_{1-y}M_yO_2 \quad \text{[Formula 2]}$$

In Formula 2, M is one or more selected from the group consisting of Al, Mg, W, Mo, Zr, Ti, Fe, V, Cr, Ba, Ca, Sr and Nb, and $0.5 \leq x < 1$ and $0 \leq y \leq 0.01$.

In a voltage profile measured by charging/discharging a secondary battery at room temperature under conditions of 0.1 C/0.1 C, the secondary battery including the above lithium cobalt-based positive electrode active material according to the present invention, an inflection point indicating a phase transition to a monoclinic system does not appear. At this time, the secondary battery may be a coin cell including a positive electrode having the positive electrode active material of the present invention and a lithium metal negative electrode.

The lithium cobalt-based positive electrode active material according to the present invention has a shell portion with a lithium defect having a three-dimensional structure on the surface thereof, thereby having excellent intercalation and de-intercalation of lithium, and has a core portion including an excessive amount of doping element, thereby having improved structural stability, so that a phase transition to a monoclinic system does not appear during charging/discharging. Accordingly, even during a high-voltage driving of 4.45 V or greater, the generation of gas and cobalt elution are suppressed, so that excellent lifespan properties and high-temperature storage properties are exhibited.

Hereinafter, a lithium cobalt-based positive electrode active material according to the present invention will be described in more detail.

Lithium Cobalt-Based Positive Electrode Active Material

The positive electrode active material according to the present invention has a core-shell structure including a core portion and a shell portion. At this time, the shell portion refers to a region adjacent to the surface of a positive electrode active material particle, and the core portion refers to the remaining regions in the positive electrode active material particle except for the shell portion. The core portion includes a lithium cobalt-based oxide doped with a doping element M, and specifically, includes a lithium cobalt-based oxide represented by Formula 1 below.

$$Li_aCo_{1-b}M_bO_2 \quad \text{[Formula 1]}$$

In Formula 1, M is one or more selected from the group consisting of Al, Mg, W, Mo, Zr, Ti, Fe, V, Cr, Ba, Ca, Sr and Nb, preferably one or more selected from the group consisting of Al, Mg, Ca, Sr, Ba, Ti, and Zr, more preferably one or more selected from Al and Mg.

Meanwhile, the doping element M may include two or more elements different from each other. For example, the doping element M may include a first doping element selected from the group consisting of Al, Mg, Ca, Sr, and Ba, and a combination thereof, and a second doping element selected from the group consisting of Ti and Zr, and a combination thereof. When the first doping element and the second doping element are included, the structural stability may be further improved.

The a represents the atomic ratio of lithium in the lithium cobalt-based oxide of Formula 1, and may be $1 \le a \le 1.2$, preferably $1 \le a \le 1.1$.

The b represents the atomic ratio of the doping element M in the lithium cobalt-based oxide of Formula 1, and may be $0.001 \le b \le 0.05$, preferably $0.001 \le b \le 0.02$. When the atomic ratio of the doping element M in the lithium cobalt-based oxide satisfies the above range, the structural stability of the positive electrode active material is improved, so that a phase transition to a monoclinic system does not appear during charging/discharging, and even during a high-voltage driving of 4.45 V or greater, the generation of gas and cobalt elution are suppressed.

Meanwhile, the shell portion includes a lithium cobalt-based oxide with a lithium defect having a ratio of the atomic number of lithium to the sum of the atomic numbers of Co and the doping element M, that is the atomic ratio of Li/(Co+M), of less than 1. Specifically, the shell portion include a lithium cobalt-based oxide represented by Formula 2.

$$Li_xCo_{1-y}M_yO_2 \quad \text{[Formula 2]}$$

In Formula 2, M is one or more selected from the group consisting of Al, Mg, W, Mo, Zr, Ti, Fe, V, Cr, Ba, Ca, Sr and Nb, preferably one or more selected from the group consisting of Al, Mg, Ca, Sr, Ba, Ti, and Zr, more preferably one or more selected from Al and Mg.

Meanwhile, the doping element M may include two or more elements different from each other. For example, the doping element M may include a first doping element selected from the group consisting of Al, Mg, Ca, Sr, and Ba, and a combination thereof, and a second doping element selected from the group consisting of Ti and Zr, and a combination thereof. When the first doping element and the second doping element are included, the structural stability may be further improved.

The x represents the atomic ratio of lithium in the lithium cobalt-based oxide of Formula 2, and may be $0.5 \le x < 1$, preferably $0.55 \le x < 1$, more preferably $0.9 \le x \le 0.99$. When the atomic ratio of lithium in the lithium cobalt-based oxide of the shell portion satisfies the above range, the lithium cobalt-based oxide of the shell portion has a three-dimensional crystal structure such as a spinel-like crystal structure, and thus, the moving speed of lithium ions in the shell portion increases, thereby improving output properties and rate properties.

The y represents the atomic ratio of the doping element M in the lithium cobalt-based oxide of Formula 2, and may be $0 \le y \le 0.01$, preferably $0 \le y \le 0.001$. It is preferable that the lithium cobalt-based oxide forming the shell portion has fewer doping elements than the lithium cobalt-based oxide forming the core portion, or no doping element. When the atomic ratio of the doping element M included in the shell portion is out of the above range, a phase transition to a monoclinic system appears during charging/discharging, and the effect of suppressing the generation of gas and cobalt elution during a high-voltage driving of 4.45 V is insignificant.

The lithium cobalt-based positive electrode active material according to the present invention includes the doping element M in an amount of 2500 ppm or more, preferably 3000 ppm or more, more preferably 3000 ppm to 5000 ppm. When the content of the doping element M in the positive electrode active material is less than 2500 ppm, a phase transition to a monoclinic system appears during charging/discharging, and the effect of suppressing the generation of gas and cobalt elution during a high-voltage driving of 4.45 V is insignificant.

In a voltage profile measured by charging/discharging a secondary battery including the lithium cobalt-based positive electrode active material according to the present invention including a lithium cobalt oxide containing a doping element M at a specific atomic ratio or higher and including a lithium-cobalt-based oxide with a lithium defect having a Li/(Co+M) atomic ratio of less than 1, an inflection point does not appear. In general, in the case of a battery applied with a lithium cobalt-based oxide having a lithium defect portion, an inflection point at which a voltage profile is bent appears in the range of 4.1 V-4.2 V during an initial charging/discharging, which indicates that a phase transition to a monoclinic system has appeared in the lithium cobalt-based oxide during the charging/discharging. However, in the case of the positive electrode active material according to the present invention, such inflection point does not appear in a charge/discharging voltage profile, which indicates there has been no phase transition to a monoclinic system.

Meanwhile, in the positive electrode active material according to the present invention, the ratio of the half diameter of the core portion to the thickness of the shell portion may be, for example, 1:0.01 to 1:0.1. When the shell portion is too thin, the effect of increasing the mobility of lithium ions is insignificant, and when the shell portion is too thick, the structural stability of an active material particle may be reduced. More specifically, under the condition of the above-mentioned ratio of the half diameter of the core portion to the thickness of the shell portion, the thickness of the shell portion may be 1-500 μm, or 10-450 μm.

Also, in the positive electrode active material according to the present invention, the lithium cobalt-based oxide represented by Formula 1 may have a layered crystal structure, and the lithium cobalt-based oxide represented by Formula 2 may have a spinel-like structure. When the core portion and the shell portion have a structure as described above, a positive electrode active material having excellent electrical properties as well as excellent structural stability may be implemented. The crystal structure of the lithium cobalt-based positive electrode active material may be determined by a typical crystal structure determination method, for example, a transmission electron microscopy, X-ray diffraction, and the like.

Meanwhile, in the positive electrode active material according to the present invention, the lithium cobalt-based oxide of the core portion and of the shell portion may each independently include lithium in a constant concentration regardless of the position, or may have a concentration gradient in which the concentration of lithium gradually increases from the surface of the active material particle to the center thereof. When lithium is distributed in the core portion and the shell portion so as to have a concentration gradient, the concentration gradient slope of the lithium of the core portion and the shell portion may be the same or different from each other, or may be in the form of a primary function or a secondary function which varies depending on the thickness of the particle from the center of the active material particle.

The concentration of lithium in the core portion and the shell portion of the positive electrode active material may be measured by various component analysis methods known in the art, for example X-ray photoelectron Spectroscopy (XPS), Transmission Electron Microscopy (TEM), Energy Disperive x-ray spectroscopy (EDS), Inductively Coupled Plasma-Atomic Emission Spectrometer (ICP-AES), Time of Flight Secondary Ion Mass Spectrometry (ToF-SIMS), and the like.

The positive electrode active material according to the present invention may have an average particle diameter ($D_{50}$) of 3 μm to 50 μm, preferably 10 μm to 50 μm. When the average particle diameter ($D_{50}$) of the positive electrode active material satisfies the above range, an appropriate specific surface area and an appropriate positive electrode mixture density may be implemented. At this time, the average particle diameter ($D_{50}$) of the positive electrode active material refers to a particle diameter at 50% in a particle diameter distribution, and may be, for example, measured by a laser diffraction method. Specifically, the positive electrode active material particles are dispersed in a dispersion medium, and then introduced to a commercially available laser diffraction particle size measurement device (for example, Microtrac MT 3000) to be irradiated with an ultrasonic wave of about 28 kHz to an output of 60 W. Thereafter, the particle diameter may be measured at 50% in particle diameter distribution.

The positive electrode active material according to the present invention has excellent electrical properties due to the shell portion with a lithium defect, and has excellent stability even during a high-voltage driving of 4.45 V due to the core portion including a doping element M in a high concentration. Therefore, the positive electrode active material according to the present invention may be usefully applied to a secondary battery driven at a high voltage of 4.45 V or greater.

Method for Preparing Lithium Cobalt-Based Positive Electrode Active Material

Next, a method for preparing a lithium cobalt-based positive electrode active material according to the present invention will be described.

The method for preparing a lithium cobalt-based positive electrode active material according to the present invention includes (1) a first step in which a core portion including a lithium cobalt-based oxide represented by Formula 1 below is formed by mixing a first cobalt raw material, a first lithium raw material, and a doping element M raw material, and then subjecting the mixture to a first heat treatment, and (2) a second step in which a shell portion including a lithium cobalt-based oxide represented by Formula 2 below is formed by mixing the lithium cobalt-based oxide represented by Formula 1 above and a second cobalt raw material, and then subjecting the mixture to a second heat treatment.

Hereinafter, each step will be described in detail.

(1) First Step: FORMING CORE PORTION

First, a core portion is formed by mixing a first cobalt raw material, a first lithium raw material, and a doping element M raw material, and then subjecting the mixture to a first heat treatment.

The first cobalt raw material may be, for example, an oxide, a hydroxide, an oxyhydroxide, a halide, a nitrate, a carbonate, an acetate, an oxalate, a citrate, or a sulfate, and the like, all containing cobalt, more specifically $Co(OH)_2$, $Co_3O_4$, CoOOH, $Co(OCOCH_3)_2 \cdot 4H_2O$, $Co(NO_3)_2 \cdot 6H_2O$, or $CoSO_4 \cdot 7H_2O$, and the like, and any one thereof or a mixture of two or more thereof may be used.

The first lithium-containing raw material may be, for example, an oxide, a hydroxide, an oxyhydroxide, a halide, a nitrate, a carbonate, an acetate, an oxalate, a citrate, or a sulfate, and the like, all containing lithium, more specifically $Li_2CO_3$, $LiNO_3$, $LiNO_2$, LiOH, $LiOH \cdot H_2O$, LiH, LiF, LiCl, LiBr, LiI, $Li_2O$, $Li_2SO_4$, $CH_3COOLi$, or $Li_3C_6H_6O_2$, and the like, all containing lithium, and any one thereof or a mixture of two or more thereof may be used.

The doping element M raw material may be one or more metals selected from the group consisting of Al, Mg, W, Mo, Zr, Ti, Fe, V, Cr, Ba, Ca, Sr, and Nb, or an oxide, a hydroxide, an oxyhydroxide, a halide, a nitrate, a carbonate, an acetate, an oxalate, a citrate, or a sulfate, and the like, all containing the same. Any one thereof or a mixture of two or more thereof may be used. Among these, one or more metals selected from Al and Mg, or an oxide, a hydroxide, an oxyhydroxide, a halide, a nitrate, a carbonate, an acetate, an oxalate, a citrate, or a sulfate, all including the one or more metals are specifically preferable.

Meanwhile in the first step, the first cobalt raw material, the first lithium raw material, and the doping element M raw material may be mixed in an amount such that the atomic ratio of Li/(Co+M) of the core portion is 1 to 1.2, preferably 1 to 1.1. When the mixing ratio of the first cobalt raw material and the first lithium raw material satisfies the above range, a core portion including a lithium cobalt-based oxide having a layered structure may be formed.

Meanwhile, the first cobalt raw material and the first lithium raw material may be introduced together at once, or may be introduced separately such that the Li/(Co+M) ratio is decreased over time. In the latter case, a core portion having a concentration gradient in which the concentration of lithium decreases from the center of the core portion to the surface thereof may be formed.

Meanwhile, the doping element M raw material is mixed in an amount of 2500 ppm or more, preferably 3000 ppm or more, more preferably 3000 ppm to 5000 ppm based on the total weight with a lithium cobalt-based positive electrode active material to be finally formed. When an excessive amount of doping element M raw material is introduced when forming the core portion as described above, the structural stability of the positive electrode active material is improved, so that a phase transition to a monoclinic system may be prevented during charging/discharging. Accordingly, even during a high-voltage driving of 4.45 V or greater, a battery having excellent lifespan properties may be implemented.

Meanwhile, the first heat treatment for the mixture of the raw materials may be performed in a temperature range of at 950° C. to 1100° C., preferably 1000° C. to 1060° C. When the temperature of the first heat treatment satisfies the above range, the generation of unreacted raw material residues and side reactants is minimized, so that the deterioration of discharge capacity, cycle properties, and driving voltage may be prevented.

The first heat treatment may be performed in the atmosphere or in an oxygen atmosphere, and the first heat treatment may be performed for 8-25 hours, preferably 12-18 hours. When the duration of the first heat treatment satisfies the above range, the diffusion reaction between raw materials may be sufficiently achieved.

Through the process as described above, the core portion including the lithium cobalt-based oxide represented by Formula 1 is formed. The detailed description of the lithium cobalt-based oxide represented by Formula 1 is the same as described above, and thus, a detailed description thereof will be omitted.

(2) Second Step: Forming Shell Portion

Next, a shell portion is formed by mixing the lithium cobalt-based oxide represented by Formula 1 which is formed through the first step and a second cobalt raw material, and then subjecting the mixture to a second heat treatment.

When the second heat treatment is performed by mixing the lithium cobalt-based oxide represented by Formula 1 and the second cobalt raw material, lithium present on the surface of the lithium cobalt-based oxide represented by Formula 1 reacts with the second cobalt raw material during the heat treatment process to form a lithium cobalt-based oxide with a lithium defect having the Li/(Co+M) atomic ratio of less than 1.

At this time, the second cobalt raw material may be, for example, an oxide, a hydroxide, an oxyhydroxide, a halide, a nitrate, a carbonate, an acetate, an oxalate, a citrate, or a sulfate, and the like, all containing cobalt, more specifically $Co(OH)_2$, $Co_3O_4$, $CoOOH$, $Co(OCOCH_3)_2 \cdot 4H_2O$, $Co(NO_3)_2 \cdot 6H_2O$, or $CoSO_4 \cdot 7H_2O$, and the like, and any one thereof or a mixture of two or more thereof may be used. The second cobalt raw material may be the same as the first cobalt raw material, or may be different therefrom.

Meanwhile, in the present step, a second lithium raw material may be further mixed, if necessary. When the second cobalt raw material and the second lithium raw material are used together, the second cobalt raw material and the second lithium raw material may be mixed in an amount such that the atomic ratio of Li/(Co+M) of the shell portion is 0.50 to less than 1, preferably 0.55 to less than 1, more preferably 0.90 to 0.99.

The second lithium-containing raw material may be, for example, an oxide, a hydroxide, an oxyhydroxide, a halide, a nitrate, a carbonate, an acetate, an oxalate, a citrate, or a sulfate, and the like, all containing lithium, more specifically $Li_2CO_3$, $LiNO_3$, $LiNO_2$, $LiOH$, $LiOH \cdot H_2O$, $LiH$, $LiF$, $LiCl$, $LiBr$, $LiI$, $Li_2O$, $Li_2SO_4$, $CH_3COOLi$, or $Li_3C_6H_6O_7$, and the like, all containing lithium, and any one thereof or a mixture of two or more thereof may be used. The second lithium raw material may be the same as the first lithium raw material, or may be different therefrom.

Meanwhile, the second cobalt raw material and the second lithium raw material may be introduced together at once, or may be introduced separately such that the Li/(Co+M) ratio is decreased over time. In the latter case, a core portion having a concentration gradient in which the concentration of lithium decreases from the center of the shell portion to the surface thereof may be formed.

Meanwhile, the second heat treatment may be performed in a temperature range of at 500° C. to 1050° C., preferably 750° C. to 1000° C. When the second heat treatment temperature satisfies the above range, the lithium cobalt-based oxide of the shell portion may be formed to have a spinel-like structure. Specifically, when the second heat treatment temperature is less than 500° C., crystallization is not sufficiently achieved, so that the effect of improving the mobility of lithium ions may be insignificant. When the second heat treatment temperature is greater than 1050° C., crystallization may be excessively achieved or Li is evaporated to formed an unstable structure.

The second heat treatment may be performed in the atmosphere or in an oxygen atmosphere, and the second heat treatment may be performed for 5-25 hours, preferably 8-18 hours, preferably 8-12 hours. When the duration of the second heat treatment satisfies the above range, a stable spinel-like crystal structure may be formed in the shell portion.

Through the process as described above, the shell portion including the lithium cobalt-based oxide represented by Formula 2 is formed. The detailed description of the lithium cobalt-based oxide represented by Formula 2 is the same as described above, and thus, a detailed description thereof will be omitted.

A positive electrode active material according to the present invention prepared as described above has a core portion including a doping element M in a high concentration, thereby having excellent structural stability. Accordingly, even though a shell portion with a lithium defect is present, a phase transition to a monoclinic system does not appear during charging/discharging, and even during a high-voltage driving of 4.45 V or greater, the generation of gas and cobalt elution are suppressed. Also, since the shell portion of the lithium defect having a three-dimensional structure is included, the lithium ion moving speed is fast, so that excellent electrical properties may be exhibited.

Positive Electrode and Lithium Secondary Battery

Next, a positive electrode according to the present invention will be described.

The positive electrode active material according to the present invention may be usefully used for manufacturing a positive electrode for a secondary battery.

Specifically, a positive electrode for a secondary battery according to the present invention includes a positive electrode current collector, and a positive electrode active material layer formed on the positive electrode current collector. At this time, the positive electrode active material layer includes the positive electrode active material according to the present invention.

The positive electrode may be manufactured according to a typical manufacturing method of a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive material and/or a binder, in a solvent, applying the mixture on at least one surface of a positive electrode current collector, followed by drying and then roll-pressing. Alternatively, the positive electrode may be manufactured by casting the positive electrode mixture on a separate support, and then laminating a film peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 µm to 500 µm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, a non-woven body, and the like.

On at least one surface of the current collector, a positive electrode active material layer including the positive electrode active material according to the present invention, and when necessary, further including at least one of a conductive material or a binder optionally is disposed.

At this time, the positive electrode active material is the positive electrode active material according to the present invention, and may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electronic conductivity without causing a chemical change in a battery to be constituted. Specific examples of the conductive material may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

Also, the binder serves to improve the bonding between positive electrode active material particles and the adhesion between the positive electrode active material and the current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer.

Meanwhile, the solvent used for preparing the positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness, preparation yield, viscosity, and the like of a slurry.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by manufacturing a negative electrode mixture by dissolving or dispersing components constituting a negative electrode active material layer, which are a negative electrode active material, a conductive material and/or a binder, in a solvent, applying the mixture on at least one surface of a negative electrode current collector, followed by drying and then roll-pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 µm to 500 µm, and as in the case of the positive electrode current collector, microscopic irregularities may be formed on a surface of the negative electrode current collector to improve the adhesion of a negative electrode active material. For example, the negative electrode current collector may be used in various forms such as a film, a sheet, a foil, a net, a porous body, a foam, a non-woven body, and the like.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_v(0<v<2)$, $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, a meso-carbon microbead, a mesophase pitch, and high-temperature sintered carbon such as petroleum or a coal tar pitch derived coke.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, as the separator, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having high ionic conductivity and high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, when the cyclic carbonate and the chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in addition to the above electrolyte components. At this time, the additive may be included in an amount of 0.1 wt % to 5 wt % based on the total weight of the electrolyte.

As described above, a secondary battery including the positive electrode active material according to the present invention has excellent electrical properties and high-temperature storage properties, and thus, may be usefully applied to portable devices such as a mobile phone, a notebook computer, and a digital camera, and to electric cars such as a hybrid electric vehicle (HEV). Particularly, the secondary battery according to the present invention may be used as a high-voltage battery of 4.45 V or greater.

In addition, the secondary battery according to the present invention may be used as a unit cell of a battery module, and the battery module may be applied to a battery pack. The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

Example 1

46.93 parts by weight of $Li_2CO_3$ powder, 100 parts by weight of $Co_3O_4$ powder, and 0.332 parts by weight of $Al_2O_3$ were mixed, and then the mixture was subjected to a first heat treatment for 15 hours at 1050° C. to prepare $Li_{1.02}Co_{0.994}Al_{0.006}O_2$ (core portion).

Based on 100 parts by weight of the lithium cobalt-based oxide prepared as described above, 3.2 parts by weight of $Li_2CO_3$ powder and 7.4 parts by weight of $Co_3O_4$ powder were mixed, and then the mixture was subjected to a second heat treatment for 10 hours at 900° C. to prepare a lithium cobalt-based positive electrode active material A having a shell portion including $Li_{0.6}CoO_2$ formed on the surface of the $Li_{1.02}Co_{0.994}Al_{0.006}O_2$ (core portion).

Example 2

A lithium cobalt-based positive electrode active material B was prepared in the same manner as in Example 1 except that $Li_{1.02}Co_{0.9932}Al_{0.0068}O_2$ (core portion) was prepared by mixing 0.443 parts by weight of $Al_2O_3$ when preparing a core portion.

Example 3

A lithium cobalt-based positive electrode active material C was prepared in the same manner as in Example 1 except that $Li_{1.02}Co_{0.9914}Al_{0.0086}O_2$ (core portion) was prepared by mixing 0.553 parts by weight of $Al_2O_3$ when preparing a core portion.

Comparative Example 1

A lithium cobalt-based positive electrode active material D was prepared in the same manner as in Example 1 except that $Li_{1.02}Co_{0.9983}Al_{0.0017}O_2$ (core portion) was prepared by mixing 0.111 parts by weight of $Al_2O_3$ when preparing a core portion.

Comparative Example 2

A lithium cobalt-based positive electrode active material E was prepared in the same manner as in Example 1 except that $Al_2O_3$, which is a doping element raw material, was not used.

Example 4

46.96 parts by weight of $Li_2CO_3$ powder, 100 parts by weight of $Co_3O_4$ powder, 0.443 parts by weight of $Al_2O_3$, and 0.21 parts by weight of $MgO_2$ were mixed, and then the mixture was subjected to a first heat treatment for 15 hours at 1050° C. to prepare $LiCo_{0.9912}Al_{0.0068}Mg_{0.003}O_2$ (core portion).

Based on 100 parts by weight of the lithium cobalt-based oxide prepared as described above, 3.2 parts by weight of $Li_2CO_3$ powder and 7.4 parts by weight of $Co_3O_4$ powder were mixed, and then the mixture was subjected to a second heat treatment for 10 hours at 900° C. to prepare a lithium cobalt-based positive electrode active material F having a shell portion including $Li_{0.6}CoO_2$ formed on the surface of the $LiCo_{0.9912}Al_{0.0068}Mg_{0.003}O_2$ (core portion).

Comparative Example 3

46.96 parts by weight of $Li_2CO_3$ powder and 100 parts by weight of $Co_3O_4$ powder were mixed, and then the mixture was subjected to a first heat treatment for 15 hours at 1050° C. to prepare $LiCoO_2$ (core portion).

Based on 100 parts by weight of the lithium cobalt-based oxide prepared as described above, 3.2 parts by weight of $Li_2CO_3$ powder, 7.4 parts by weight of $Co_3O_4$ powder, and 0.332 parts by weight of $Al_2O_3$ were mixed, and then the mixture was subjected to a second heat treatment for 10 hours at 900° C. to prepare a lithium cobalt-based positive electrode active material G having a shell portion including $LiCo_{0.9957}Al_{0.0043}O_2$ formed on the surface of the $LiCoO_2$ (core portion)

Experimental Example 1: Measurement of Doping Element Content

The doping element content of the positive electrode active materials A-G prepared by Examples 1-4 and Comparative Examples 1-3 was measured by ICP analysis. The ICP analysis was performed using inductively coupled plasma light-emission spectrometer (ICP-OES; Optima 7300DV, PerkinElmer Co.). The measurement results are shown in Table 1 below.

TABLE 1

|  | Doping element content (ppm) |
|---|---|
| Example 1 | 3000 |
| Example 2 | 4000 |
| Example 3 | 5000 |
| Example 4 | 8500 |
| Comparative Example 1 | 1000 |
| Comparative Example 2 | 0 |
| Comparative Example 3 | 3000 |

Experimental Example 2: Measurement of Lithium Defect Portion

The positive electrode active materials prepared by Example 1 and Comparative Example 1 were etched with argon gas, and the Li/Co atomic ratio of the shell portion was measured using X-ray photoelectronspectroscopy.

Figure 1:
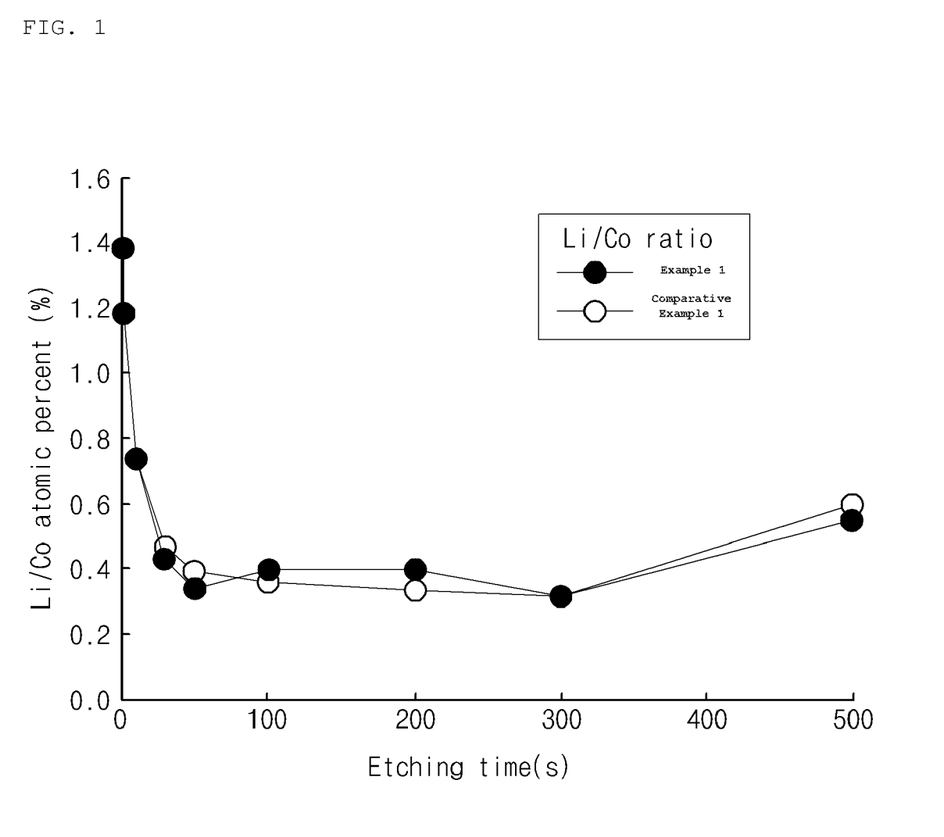
FIG. 1 is a graph showing a Li/Co atomic ratio measured while etching a surface portion of the lithium cobalt-based positive electrode active material prepared by each of Example 1 and Comparative Example 1.

The measurement results are shown in FIG. 1. Through FIG. 1, it was confirmed that a lithium defect portion having a Li/Co atomic ratio of less than 1 was present on a surface portion of the positive electrode active material of Example 1 and Comparative Example 1.

Experimental Example 3: Charge/Discharge Profile

Coin cells (Li metal negative electrode was used) were manufactured by using the positive electrode active materials which were prepared by Examples 1-4 and Comparative Examples 1-3, and then charged and discharged at room temperature (25° C.) under conditions of 0.2 C/0.2 C to measure a voltage profile. The measurement results are shown in FIG. 2.

Figure 2:
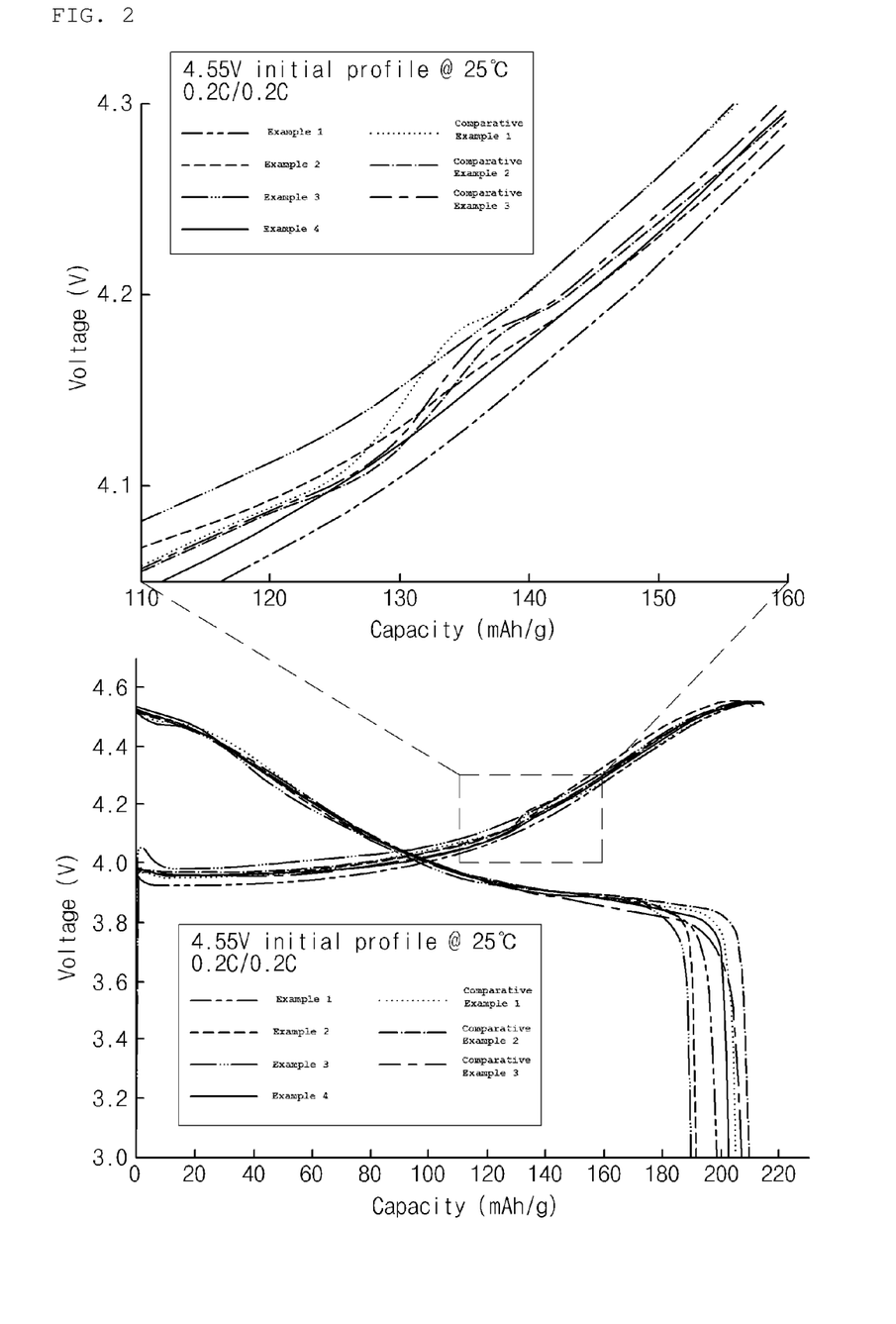
FIG. 2 is a graph showing a voltage profile of secondary batteries applied with the lithium cobalt-based positive electrode active materials prepared by Examples 1-4 and Comparative Examples 1-3.

As shown in FIG. 2, in the case of batteries using the positive electrode active materials of Examples 1-4, an inflection point indicating a phase transition to a monoclinic system did not appear, whereas in the case of batteries using the positive electrode active materials of Comparative Examples 1-3, an inflection point was observed near 4.15 V.

Experimental Example 4: Cobalt Elution Amount

The positive electrode active materials respectively prepared in Examples 1-4 and Comparative Examples 1-3 were used to manufacture lithium secondary batteries.

Specifically, the positive electrode active material respectively prepared in Examples and Comparative Examples, carbon black as a conductive material, and PVdF as a binder were mixed in N-methylpyrrolidone, which is a solvent, at a weight ratio of 90:5:5 to prepare a positive electrode mixture (viscosity: 5000 mPa·s), and the mixture was applied on an aluminum current collector, dried, and roll-pressed to manufacture a positive electrode.

Also, artificial graphite, mesocarbon microbead (MCMB), as a negative electrode active material, carbon black as a conductive material, and PVdF as a binder were mixed in N-methylpyrrolidone, which is a solvent, at a weight ratio of 85:10:5 to prepare a negative electrode mixture, and the mixture was applied on a copper current collector, dried, and roll-pressed to manufacture a negative electrode.

A porous polyethylene separator was interposed between the positive electrode and the negative electrode which were prepared as described above to prepare an electrode assembly, and then the electrode assembly was placed inside a battery case. Thereafter, an electrolyte was injected into the case to manufacture a coin cell. At this time, the electrolyte was prepared by dissolving lithium hexafluorophosphate having a concentration of 1.15 M in an organic solvent in which ethylene carbonate/dimethyl carbonate/ethylmethyl carbonate were mixed in a volume ratio of 3:4:3.

The coin cells manufactured as described above was charged to 4.5 V. After the charging, the positive electrode was separated, and then washed with a dichloromethane (DCM) solution. Thereafter, the washed positive electrode was placed in a Nalgene bottle with 4 mL of an electrolyte. In order to prevent the electrolyte from being evaporated, the Nalgene bottle was completely sealed with a Parafilm and an aluminum pouch, and the sealed bottle was stored in a chamber at 60° C. for 1 week and 3 weeks, respectively. Thereafter, the positive electrode active material that may be present as a floating matter in the electrolyte was completely removed using a sealing paper filter to extract the electrolyte, and then the electrolyte was evaporated to measure the amount of cobalt present in the electrolyte (that is, the cobalt elution amount) by ICP analysis. The ICP analysis was performed using inductively coupled plasma light-emission spectrometer (ICP-OES; Optima 7300DV, PerkinElmer Co.).

The measurement results are shown in Table 2 below.

TABLE 2

| | 1 week (ppm) | 3 weeks (ppm) |
|---|---|---|
| Example 1 | 520 | 1180 |
| Example 2 | 485 | 1150 |
| Example 3 | 445 | 1050 |
| Example 4 | 470 | 1120 |
| Comparative Example 1 | 755 | 2200 |
| Comparative Example 2 | 920 | 2450 |
| Comparative Example 3 | 735 | 2225 |

As shown in Table 2, the cobalt elution amount of the lithium secondary batteries each prepared using the positive electrode active material of Examples 1-4 was significantly smaller than that of the lithium secondary batteries each prepared using the positive electrode active material of Comparative Examples 1-3. Also, it can be seen that as the high-temperature storage duration was longer, the difference in cobalt elution amount between Examples and Comparative Examples was greater.

The invention claimed is:

1. A lithium cobalt-based positive electrode active material comprising:
   a core portion including a lithium cobalt-based oxide represented by Formula 1 below; and
   a shell portion including a lithium cobalt-based oxide represented by Formula 2 below, wherein the lithium cobalt-based positive electrode active material comprises 2500 ppm or more of a doping element M based on a total weight of the lithium cobalt-based positive electrode active material:

$$Li_aCo_{1-b}M_bO_2 \quad \text{[Formula 1]}$$

in Formula 1, M includes Al and optionally includes one or more selected from the group consisting of Mg, W, Mo, Zr, Ti, Fe, V, Cr, Ba, Ca, Sr and Nb, and $1 \leq a \leq 1.2$ and $0.005 \leq b \leq 0.05$, and $$Li_xCo_{1-y}M_yO_2 \quad \text{[Formula 2]}$$

in Formula 2, M is one or more selected from the group consisting of Mg, W, Mo, Zr, Ti, Fe, V, Cr, Ba, Ca, Sr and Nb, and $0.5 \leq x \leq 1$ and $0 \leq y \leq 0.01$.

2. The lithium cobalt-based positive electrode active material of claim 1, wherein the doping element M is one or more selected from the group consisting of Al, Mg, Ca, Sr, Ba, Ti, and Zr.

3. The lithium cobalt-based positive electrode active material of claim 1, wherein the doping element M comprises a first doping element selected from the group consisting of Al, Mg, Ca, Sr, and Ba, and a combination thereof, and a second doping element selected from the group consisting of Ti, and Zr, and a combination thereof.

4. The lithium cobalt-based positive electrode active material of claim 1, wherein Al and Mg are present in the core portion.

5. The lithium cobalt-based positive electrode active material of claim 1, wherein the lithium cobalt-based oxide represented by Formula 1 above has a layered crystal structure, and
   the lithium cobalt-based oxide represented by Formula 2 above has a spinel-like crystal structure.

6. The lithium cobalt-based positive electrode active material of claim 1, wherein the lithium cobalt-based positive electrode active material comprises 3000 ppm or more of the doping element M based on the total weight of the lithium cobalt-based positive electrode active material.

7. A method for preparing a lithium cobalt-based positive electrode active material, comprising:
   a first step in which a core portion including a lithium cobalt-based oxide represented by Formula 1 below is formed by mixing a first cobalt raw material, a first lithium raw material, and a doping element M raw material to obtain a first mixture, and then subjecting the first mixture to a first heat treatment; and
   a second step in which a shell portion including a lithium cobalt-based oxide represented by Formula 2 below is formed by mixing the lithium cobalt-based oxide represented by Formula 1 and a second cobalt raw material to obtain a second mixture, and then subjecting the second mixture to a second heat treatment, wherein
   the doping element M raw material comprises one or more selected from the group consisting of Al, Mg, W, Mo, Zr, Ti, Fe, V, Cr, Ba, Ca, Sr, and Nb, and is mixed in an amount of 2500 ppm or more based on a total weight of the lithium cobalt-based positive electrode active material:

$$Li_aCo_{1-b}M_bO_2 \quad \text{[Formula 1]}$$

in Formula 1, M includes Al and optionally includes one or more selected from the group consisting of Mg, W, Mo, Zr, Ti, Fe, V, Cr, Ba, Ca, Sr and Nb, and $1 \leq a \leq 1.2$ and $0.005 \leq b \leq 0.05$, and $$Li_xCo_{1-y}M_yO_2 \quad \text{[Formula 2]}$$

in Formula 2, M is one or more selected from the group consisting of Mg, W, Mo, Zr, Ti, Fe, V, Cr, Ba, Ca, Sr and Nb, and $0.5 \leq x \leq 1$ and $0 \leq y \leq 0.01$.

8. The method of claim 7, wherein, in the first step, the first cobalt raw material, the first lithium raw material, and the doping element M raw material are mixed in an amount such that the atomic ratio of Li/(Co+M) of the core portion is 1 to 1.2.

9. The method of claim 7, wherein the second step further comprises mixing a second lithium raw material.

10. The method of claim 9, wherein, in the second step, the second cobalt raw material and the second lithium raw material are mixed in an amount such that the atomic ratio of Li/(Co+M) of the shell portion is 0.50 to less than 1.

11. A positive electrode comprising the positive electrode active material according to claim 1.

12. A lithium secondary battery comprising the positive electrode of claim 11.

13. The lithium secondary battery of claim 12, wherein the driving voltage of the lithium secondary battery is 4.45 V or greater.

14. The lithium cobalt-based positive electrode active material of claim 1, wherein the cobalt-based positive electrode active material comprises 3000 ppm to 5000 ppm of the doping element M based on the total weight of the positive electrode active material.

15. The method of claim 7, wherein the doping element M raw material is mixed in an amount of 3000 ppm to 5000 ppm based on the total weight of the lithium cobalt-based positive electrode active material.

16. The method of claim 7, wherein Al and Mg are present in the core portion.

17. The lithium secondary battery of claim 12, wherein, when charging and discharging the secondary battery at room temperature and 0.2 C, an inflection point does not appear in a measured voltage profile.

* * * * *